March 26, 1946.  E. DAWSON  2,397,130
ROTARY VALVE
Filed March 3, 1944
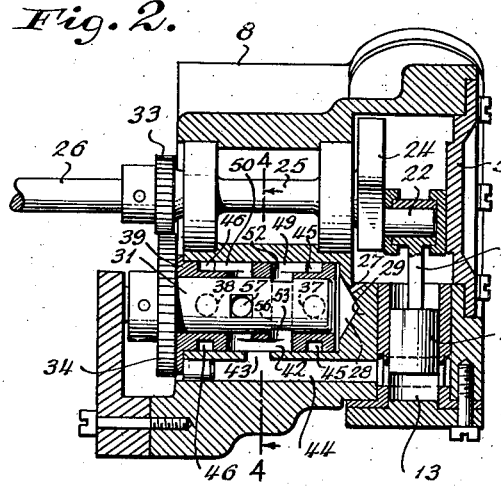
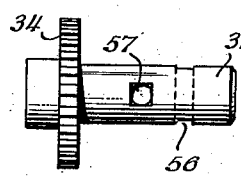
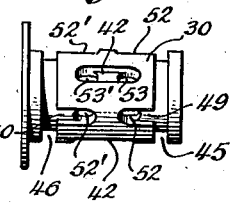
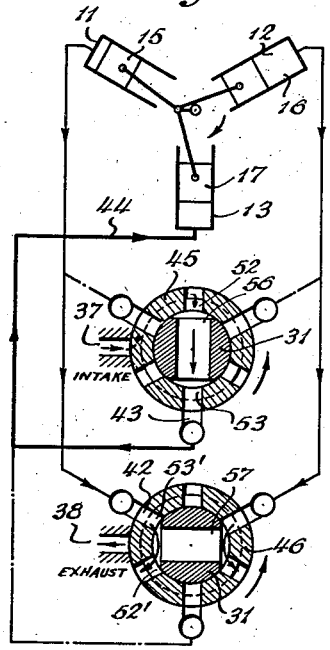
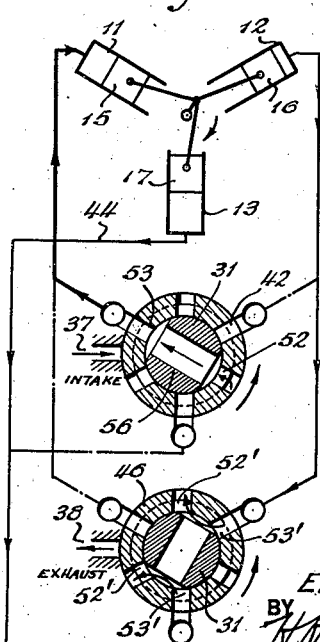
INVENTOR
EDWARD DAWSON
BY
ATTORNEY.

Patented Mar. 26, 1946

2,397,130

UNITED STATES PATENT OFFICE 2,397,130

ROTARY VALVE

Edward Dawson, New York, N. Y., assignor to Sperry Gyroscope Company, Inc., a corporation of New York Application March 3, 1944, Serial No. 524,972

14 Claims. (Cl. 121—121)

This invention is concerned with means for distributing the working medium in a fluid flow system and is particularly related to an improved rotary valving means for use with hydraulic power transmission or positioning motors such as servo motors and other types of fluid pressure operated motors, suitable for incorporation in control systems of many different types. The invention will function equally well whether the motor with which it is used is a driving or a driven element of the system.

In the past, many types of apparatus have been designed for servo motor use, but in many cases these devices have been unduly intricate and therefore expensive to build. In other cases due to the labyrinthine fluid passages through the apparatus, friction losses have been high and resulting efficiencies low, requiring the use of unnecessarily large power supply sources for satisfactory operation of the equipment.

It is a primary object of this invention to provide a pressure distributor or valve having a minimum number of parts and these of a simplicity of design rendering the equipment adaptable to manufacture in large quantities at low cost.

It is another object of this invention to provide an improved well balanced, full floating rotary valve which will be characterized by fluid flow through relatively direct passageways.

It is a further object of the invention to provide a valve having very little friction between moving parts and with end thrust almost entirely eliminated, thereby to provide a non-locking valving means which can be operated with a minimum amount of torque and with little energy lost in friction.

It is likewise an object of this invention to provide servo apparatus whose parts are so designed and arranged that relatively little precision machine work is required to insure satisfactory alignment and vibration free operation of the equipment.

A further object of the invention is to provide a valve which may be operated at the lowest possible speed consistent with proper timing of the fluid pressure distribution and smooth operation of the motor.

The invention also aims at providing a valve having passageways and ports of a configuration to produce gradual rather than abrupt pressure changes as the fluid flows through the various ports and passageways.

Other objects and advantages will become apparent from the following specification and the accompanying drawing illustrating one form of structure in which the principle of the invention may be incorporated.

In the drawing:

Fig. 1 is an end view of a radial three cylinder hydraulic motor in which the invention may be incorporated. This view represents the motor with the end cover removed.

Fig. 2 is a sectional view of the motor taken along line 2—2 of Fig. 1.

Fig. 3A is an elevation of the valve body showing the relative location of the two fluid channels passing diagonally through the valve body.

Fig. 3B is an elevation of the valve sleeve showing the location of the ports and fluid passageways.

Fig. 4 is a fragmentary sectional view taken along line 4—4 of Fig. 2 in a plane at right angles to the longitudinal axis of the valve.

Figs. 5A and 5B are diagrams showing schematically the fluid distribution passageways with the valve in two different representative positions.

In general, the invention comprehends a cylindrical valve body adapted to rotate within a cylindrical ported valve sleeve, the valve body having non-parallel fluid passageways passing diametrically through it from one side to the other. The valve will, of course, have sufficient ports to provide an intake and an exhaust port for each cylinder of the motor into which the valve is built. It is also contemplated that the valve structure will be offset from the axis of the motor crankshaft and will be driven from the crankshaft through suitable speed reducing means.

The form of the invention described in the following specification is such as is suitable for use in a radial three cylinder hydraulic motor. It is obvious, however, that the invention is readily adaptable for use with motors having more or less than three cylinders and also that it may equally well be used with a hydraulic pump. It is likewise obvious that the motor cylinders may be arranged in line as well as radial and that with suitable modifications, the valve may be used with a wide variety of fluid responsive mechanisms.

Reference should now be had to the drawing in conjunction with which the construction of an illustrative embodiment of the invention will be made clear.

In Figs. 1 and 2 there is shown a conventional radial three cylinder hydraulic motor 8, such as is frequently used in fluid operated servo systems to which this invention may readily be applied.

Cast integral with motor block 9 are three cylinders 11, 12 and 13, within which pistons 15, 16 and 17 are arranged for reciprocation. These three pistons are connected by piston rods 19, 20 and 21, respectively, to a common crank pin 22. The motion of crank pin 22 is conveyed to the crankshaft 25 of the motor by means of crank 24. As is usual in engines of this type, crank 24 is provided with a suitable counterweight for reducing vibration within the engine. The extension of crankshaft 25 provides an output or driving shaft 26 to which the load which the motor is intended to drive or operate, may be suitably connected.

Within motor block 9 there is provided a cylindrical recess 28 adapted for the accommodation of the valving means necessarily provided with a reciprocating type of engine. The walls of this valve recess 28 provide a casing 29 for the valve of the motor. Rigidly fixed within the valve recess 28 is a valve sleeve, or seat, 30 provided with suitable ports for the passage of the operating fluid into and out of the valve as the motor operates. Mounted for rotation within valve sleeve 30 is a cylindrical valve body 31. By means of spur gear 33, rigidly connected to drive shaft 26, and spur gear 34 rigidly connected to valve body 31, valve body 31 is driven from the output shaft 26, but at a reduced speed as will be evident from the fact that spur gear 34 has many more teeth than spur gear 33. In the illustrative embodiment disclosed in this specification, valve body 21 is rotated at one-half the speed of the crankshaft.

In Fig. 2 there is shown an intake port 37 and an exhaust port 38 within the valve casing 29, which by passageways (not shown) are connected with supply conduit 39 and exhaust conduit 40, respectively (see Fig. 1). By means of these passageways, the pressure fluid by which the motor is operated is conveyed into and out of the valve. In Fig. 2, valve sleeve 30 is shown provided with a central fluid passage slot 42 which by means of radial port 43 and axial port 44 conveys the operating fluid from the valve into cylinder 13. Valve sleeve 30 is likewise shown provided with two square cut annular rings 45, 46 adjacent to the opposite ends of the valve sleeve. Annular ring 45 together with the wall of valve casing 29 provides a supply manifold within the valve, the high pressure fluid after entering the valve being free to flow around this annular ring 45. In a similar manner annular ring 46 together with the wall of valve casing 29 provides an exhaust manifold around which the low pressure fluid exhausted from the motor may circulate in seeking the exhaust port 38 on its way out of the motor. Bleeder connection 27 prevents the building up of any pressure behind valve body 31 in the event that fluid leaks occur between valve body and sleeve.

The arrangement of the ports and channels in valve sleeve 30 and valve body 31 may best be understood by reference to Figs. 3A and 3B. In Fig. 3B there is shown to the right of the center of the valve sleeve 30, an intake port 52 which is one of three such intake ports equally spaced around the valve sleeve and in alignment with port 52', as shown. Also shown is port 53 which is one of three equally spaced ports 53 around valve sleeve 30, ports 52 and ports 53 alternating with one another, and the supply ports 52 being connected by lateral flutes 49 to the annular ring 45 which serves as a high pressure fluid supply manifold. Each of the ports 53 are cross-connected by slots 42 with similar ports 53'. As will be evident in this figure, the arrangement of the ports of the left hand end of the valve sleeve, which serve as the exhaust ports, duplicates the arrangement of the supply ports in the right hand end of the valve sleeve.

As is clearly shown in Fig. 3A, the valve body 31 contains two cylindrical channels passing diagonally through the valve, one of these channels 56 serving as an intake or supply channel, while the other channel 57 serves as an exhaust channel. It is clear that these two channels 56 and 57, while perpendicular to the longitudinal axis of valve 33, are angularly displaced relative to one another. In the arrangement shown, the displacement is 90°. In Fig. 3A it will also be apparent that valve body 31 is flattened off adjacent to the ends of channels 56 and 57 which therefore have straight line external edges and square shaped entrance and exit faces. This type construction permits the formation of a hardened steel valve body having accurately located fluid flow channels.

Fig. 2 shows an end cover 59 which may be removed for access to the interior of the motor. Fig. 1 indicates the arrangement of the pistons, piston rods, etc., as they appear with end cover 59 removed.

A typical passage of the operating fluid into and out of the motor and valve may readily be traced by reference to the drawing. The high pressure fluid coming from the hydraulic pump through supply conduit 39 passes through motor block 9 to intake port 37, next passing into annular ring 45 where it circulates around the valve sleeve entering into the various lateral flutes 49, and thereafter passing through a port 52, into channel 56, when supply channel 56 of valve body 31 registers with port 52. The fluid then passes through channel 56 and port 53 into the axial slot-shaped passageway 42, then passing through radial port 43 and an axial channel 44 into cylinder 13. Here the pressure of the fluid is exerted against piston 17, thereby driving it inward on a pressure or work stroke.

As piston 17 completes its stroke and is again approaching the outer end of cylinder 13, it will force the working fluid out through an axial passageway 44 and through radial port 43 into the slot-shaped passageway 42. The fluid now passes toward the left until it enters a port 53', after which upon registration of exhaust valve channel 57 with port 53', the fluid is free to pass through valve channel 57, outward through port 52', and lateral flute 50 into the annular ring shaped passageway 46 where it flows around the exhaust manifold, finally passing out of the motor and the valve through exhaust port 38 and exhaust conduit 40 which guides it back to the hydraulic pump from which it originally came, thus completing a cycle of operation.

It will be noted in connection with Figs. 2 and 3, that when supply channel 56 is in registration with a pair of ports 52 and 53, valve channel 57 being diametrically opposite to valve channel 56, is out of communication with exhaust ports 52' and 53', thereby closing the exhaust passageway from the valve at the time that the supply passageway through the valve is open for the passage of fluid from the hydraulic supply pump to the appropriate cylinder of the motor.

In Figs. 5A and 5B there is shown the manner in which the fluid distribution passageways through the rotary valve and into the various motor cylinders are altered as the valve rotates. In these figures it will be obvious from the direction of the arrows indicating the rotation of the valve body and the motor crank pin, that the valve and the motor rotate in opposite directions. The conditions indicated in Fig. 5B correspond to a period when the motor has revolved a third of a revolution beyond the position indicated for it in Fig. 5A and during this same interval of time, valve body 31 has revolved 1/6 of a revolution, but in the opposite direction.

Fig. 5A shows the conditions where fluid under high pressure is being supplied to cylinder 13 and piston 17, while at the same time fluid is being exhausted from the cylinders 11 and 12.

Fig. 5B shows the conditions when high pressure fluid is being supplied to cylinder 11 and fluid is being exhausted from cylinders 12 and 13. It will be readily apparent from these figures that the passageways into and out of the motor as provided in this invention are relatively direct and favorable to efficient fluid flow, particularly with reference to the annular supply and exhaust manifold passageways 45 and 46 and the straight valve channels 56 and 57 for passing the fluid straight through the valve.

A hydraulic motor or pump equipped with a valve constructed in accordance with the principles of this invention will operate as readily in one direction of rotation as in the other. Mere interchange of the connections between the motor and the supply and exhaust conduits is all that is necessary to reverse the direction of rotation of the motor. If this interchange of connection cannot be made the motor may be made to rotate in the opposite direction merely by moving the valve body axially until gears 33 and 34 are out of mesh, rotating the valve body through an angular displacement of 90° relative to the motor crank position and sliding the valve body back into mesh with the crank shaft gear 33 in the new location. These are advantages of considerable value in the construction and use of servo motors.

Since many changes could be made in the above construction and many apparently widely different embodiments of this invention could be made without departing from the scope thereof, it is intended that all matter contained in the above description or shown in the accompanying drawing shall be interpreted as illustrative and not in the limiting sense.

What is claimed is:

1. In a fluid flow system having intake and exhaust conduits and fluid pressure driven working members, a rotary fluid distributor comprising a ported casing connected to said intake and exhaust conduits, an annularly grooved sleeve within said casing including ported axial flutes laterally connected to said annular grooves, and radially-ported axial slots communicating with said working members, a cylindrical plunger rotatable within said sleeve and containing non-parallel fluid channels passing therethrough, said ports and said channels being so disposed relative to one another as to register in proper time and space relationships for providing unobstructed fluid passageways between said intake and exhaust conduits and said working members of said fluid flow system.

2. A fluid flow system as claimed in claim 1, wherein said channels pass diametrically and completely through said plunger to substantially eliminate any friction between said plunger and said sleeve due to unbalanced fluid pressures.

3. A fluid flow system as claimed in claim 1, wherein said channels in said plunger are fully chamfered at their external edges to eliminate vibration by providing gradual pressure changes as said channels approach and recede from said ports in said sleeve upon rotation of said plunger.

4. In a piston and cylinder type hydraulic mechanism, a rotary valve, comprising an outer casing having intake and exhaust ports with connecting feed lines, an intermediate valve sleeve having circumferential grooves adjacent the opposite ends thereof, radially ported axial flutes laterally connected to said circumferential grooves for forming fluid passageways therewith and radially ported axial slots midway between said circumferential grooves and overlapping said axial flutes, and having attached conduits for distributing fluid to the cylinders of said hydraulic mechanism, and rotatable within said sleeve, a cylindrical valve body having channels passing therethrough, said channels being directed at right angles to the axis of rotation of said valve body and being angularly displaced relative to one another, each channel upon valve rotation successively registering with an axial-flute port and an oppositely situated axial-slot port to complete through said valve body channels and said ports fluid passageways between the cylinders of said hydraulic mechanism and said feed lines.

5. A mechanism as claimed in claim 4, including speed reducing means between said hydraulic mechanism and said rotatable valve body to rotate said valve body at reduced speed relative to the speed of said hydraulic mechanism and reduce turbulence in the fluid stream.

6. A mechanism as claimed in claim 4, wherein the direction of fluid flow through said valve body is always in a plane perpendicular to the axis of rotation of said valve body to provide valve operation free of end thrust.

7. A mechanism as claimed in claim 4, wherein said circumferential grooves are square-cut grooves.

8. A mechanism as claimed in claim 4, wherein certain of said channels passing through said valve body conduct high pressure fluid exclusively and others of said channels conduct low pressure fluid exclusively, the direction of fluid flow through each of said channels being cyclically alternated as said valve body rotates.

9. A rotary valve for an engine, having an odd number of cylinders, comprising a cylindrical casing, a cylindrical valve body rotatable therein, fluid inlet and outlet manifolds, axially separated series of inlet and outlet ports extending radially through said casing, each of said series comprising ports equally spaced about the periphery of said casing, alternate ports communicating with one of said engine cylinders and with one of said manifolds respectively, said cylindrical valve body being provided with transverse axially separated passages extending between diametrally opposite ports of each of said series.

10. A rotary valve for an engine, having an odd number of cylinders, comprising a cylindrical casing, a cylindrical valve body rotatable therein, fluid inlet and outlet manifolds, axially separated series of inlet and outlet ports extending radially through said casing, each of said series comprising ports equally spaced about the periphery of said casing, alternate ports communicating with one of said engine cylinders and with one of said manifolds respectively, said cylindrical valve body being provided with transverse axially separated passages extending between diametrally opposite ports of each of said series, said valve being provided with a chamber connecting alternate ports of each series.

11. A rotary valve for a three-cylinder engine comprising a cylindrical casing, a cylindrical valve body rotatable within said casing and forming a fluid-tight connection between adjoining surfaces, fluid inlet and outlet manifolds, an inlet series and an outlet series of ports disposed circumferentially about said casing at axially separated points along said body, each of said series comprising three equally spaced ports communicating with the respective engine cylinders and three intervening ports connected with one of said manifolds, the port of each series communicating with a given cylinder occupying the same radial position in said casing and being interconnected by an axial passage in said casing, said body being provided with a pair of axially separated transverse bores extending diametrically between opposite ports of each series.

12. A rotary valve for a three-cylinder engine comprising a cylindrical casing, a cylindrical valve body rotatable within said casing and forming a fluid-tight connection between adjoining surfaces, fluid inlet and outlet manifolds, an inlet series and an outlet series of ports disposed circumferentially about said casing at axially separated points along said body, each of said series comprising three equally spaced ports communicating with the respective engine cylinders and three intervening ports connected with one of said manifolds, the port of each series communicating with a given cylinder occupying the same radial position in said casing and being interconnected by an axial passage in said casing, said body being provided with a pair of axially separated transverse bores extending diametrically between opposite ports of each series, each of said bores terminating in zones extending circumferentially a distance sufficient to span adjacent ports when said zone is intermediate said ports.

13. A rotary valve for a three-cylinder engine comprising a cylindrical casing, a cylindrical valve body rotatable within said casing and forming a fluid-tight connection between adjoining surfaces, fluid inlet and outlet manifolds, an inlet series and an outlet series of ports disposed circumferentially about said casing at axially separated points along said body, each of said series comprising three equally spaced ports communicating with the respective engine cylinders and three intervening ports connected with one of said manifolds, the port of each series communicating with a given cylinder occupying the same radial position in said casing and being interconnected by an axial passage in said casing, said body being provided with a pair of axially separated transverse bores extending diametrically between opposite ports of each series, said respective bores extending along diameters displaced substantially at right angles to one another.

14. In a valve structure, a casing having inlet and outlet ports, a sleeve fixed in said casing having annular grooves at the respective ends thereof one of which communicates with the inlet port and the other of which communicates with the outlet port, said sleeve including axially fluted portions at the ends thereof that connect with the respective grooves therein and central axial slots that overlap the fluted portions, and a plunger rotatably mounted in said sleeve having axially displaced radial channels passing therethrough registering with the fluted and slotted portions of said sleeve.

EDWARD DAWSON.